Jan. 24, 1967 G. W. CHILDS ETAL 3,300,207

VACUUM ACTUATED DOCUMENT FEEDER

Filed Dec. 18, 1964 4 Sheets-Sheet 1

Jan. 24, 1967 G. W. CHILDS ETAL 3,300,207

VACUUM ACTUATED DOCUMENT FEEDER

Filed Dec. 18, 1964 4 Sheets-Sheet 4

United States Patent Office 3,300,207
Patented Jan. 24, 1967

3,300,207

VACUUM ACTUATED DOCUMENT FEEDER

George W. Childs, Edgar R. Pitcher, Jr., and Ernest L. Staples, Jr., Dallas, Tex., assignors to Recognition Equipment Incorporated, a corporation of Delaware Filed Dec. 18, 1964, Ser. No. 419,510
9 Claims. (Cl. 271—26)

This invention relates to a system for feeding documents serially from a stack, and more particularly to a feeder which employs a feeder plate moving laterally at the end of the stack to apply reduced pressure or vacuum to a document at the end of the stack to shift the document into the mouth of a document transport system.

Document handling systems are widely used in numerous mechanical and electrical data processing operations. Such document handling systems may involve for example, sorter devices which sort a plurality of documents into a pre-arranged scheme or may involve a document reading device which reads encoded or imprinted information and supplies the information to an associated data processor. The information being read may be contained on the document in a number of ways. For example, magnetizable characters, punched holes or optical characters are employed. The nature of the documents being read or handled may take any number of forms such as a relatively stiff, relatively thick punched card, or it may be in the form of relatively thin flexible bank checks or other sheet material.

There are two general types of feeders for feeding relatively thin documents into a document handling system. A first type employs feeders which separate documents by means of counter-directional driving devices. A second type separates documents by vacuum devices. The present invention is directed to a system of the latter type and, while particularly adapted to the handling of tab cards or bank checks, it is not restricted to such documents but may be employed to handle cardboard, cardboard cartons, plastic and metal plates, sheets, envelopes, tags, etc. The system has a particular use in holding thin sheet material and is used for the purpose of feeding documents rapidly, one at a time into a transport system.

The present invention involves the use of a reciprocating feed plate having linear motion with means for gating a vacuum through the plate to grasp the document and includes means for preventing transfer of more than one document at one time.

In accordance with one aspect of the invention, the document feeder has a driven roller mounted adjacent to one corner of a document ray. A timing wheel having a cam sector is mounted adjacent the corner of the tray and is rotated at uniform speed periodically to engage the roller. A vacuum plenum chamber at the end of the tray is adjacent to the roller and has a feeder plate with slots therein forming a closure for one side of the chamber. The feeder plate lies along a line closely adjacent to a line which is tangent to the driven wheel at the point of contact with the timing wheel. The feeder plate is reciprocated across the face of the vacuum chamber. Means are provided for creating an opening through the feeder plate into the vacuum chamber during movement of the plate toward the roller to grasp and transport the end document in a stack for contact between the roller and the timing wheel. The slots are closed upon movement of the plate away from the roller. A second vacuum plenum chamber facing the feeder plate limits document movement from the stack to one document at a time.

For a more complete understanding of the present invention and for further objects and advantages thereof, reference may now be had to the following description taken in conjunction with the accompanying drawings in which.

Figure 1:
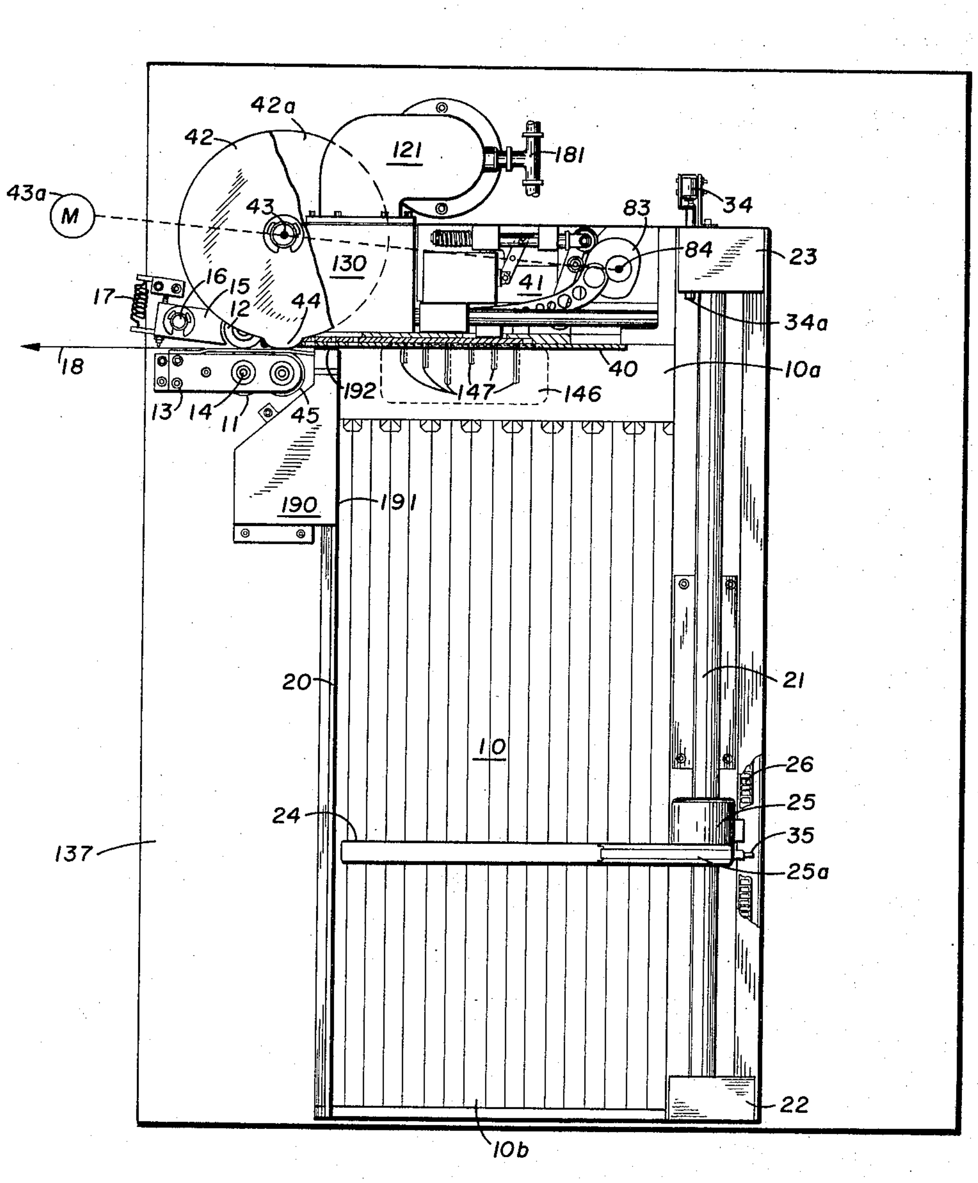
FIGURE 1 is a top view of a document feeder embodying the present invention.

Referring now to FIGURE 1, a feeder is provided which will deliver documents from the end of a stack of documents on a tray 10 into the mouth of a document transport system. Two sets of rollers 11 and 12 form the mouth of the transport system. The set of rollers 11 comprise idler rollers mounted on a suitable supporting bracket 13 for rotation on the shaft 14. In a similar manner, the set of rollers 12 is mounted on the end of a rotatable bracket 15 which is pivoted at shaft 16. The set of rollers 12 is keyed to the shaft which is driven by a suitable motor. Set 12 is resiliently biased into engagement with the set of rollers 11 by a suitable spring coupling 17. Thus, the documents will be delivered to the transport for travel along a path represented by the arrow 18.

The invention is designed to move documents periodically, one at a time, from a stack placed on tray 10 into the path represented by the arrow 18. Provision is made for preventing delivery of more than one document at any time and to minimize abrasion or damage to the documents as they are acelerated into the transport system.

Figure 2:
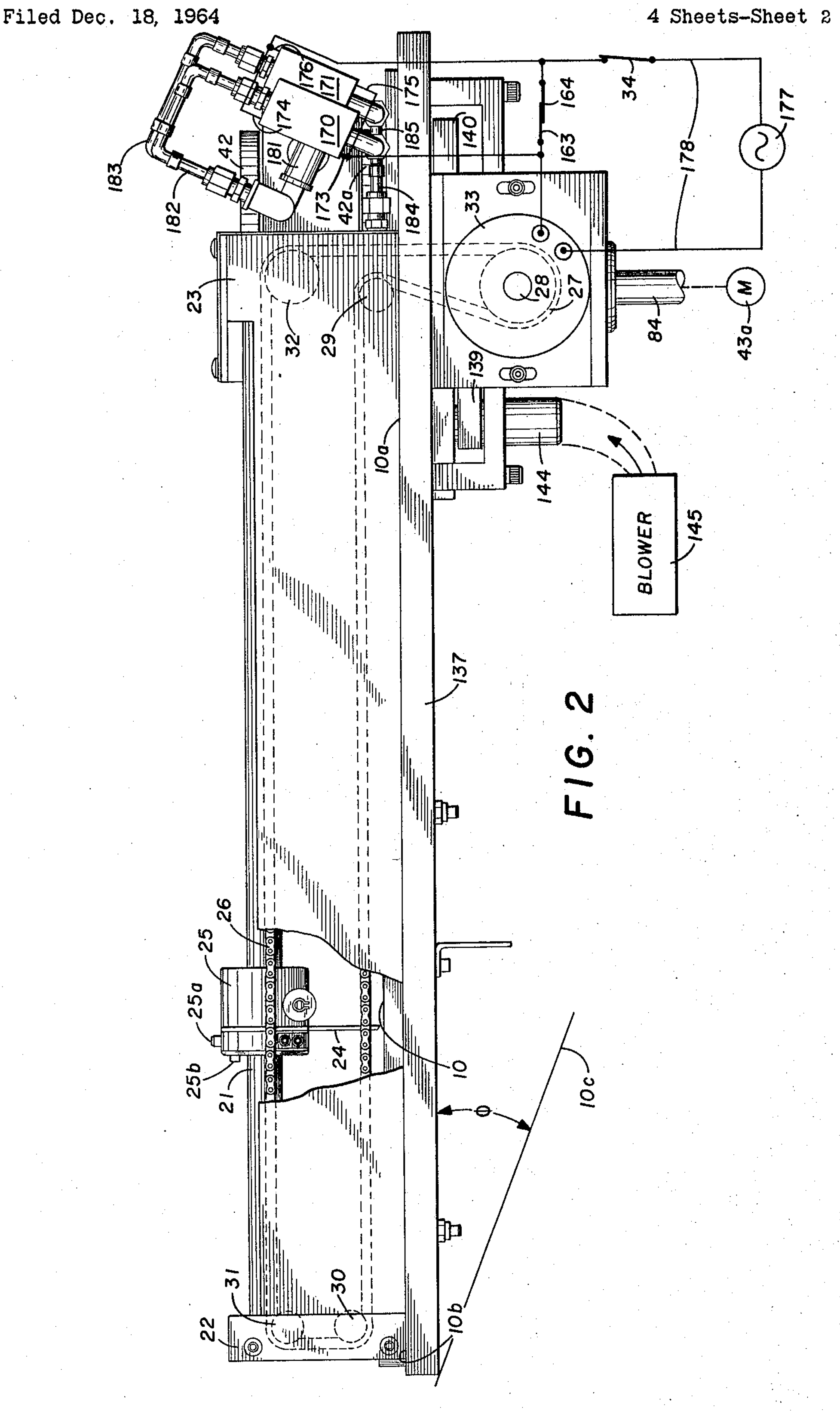
FIGURE 2 is a side view of the feeder of FIGURE 1.

The document tray 10 preferably is inclined with the end 10*a* higher than end 10*b* by an angle such as the angle $\phi$, FIGURE 2, relative to the horizontal plane 10*c*. A slide rail 20 extends along the left side of the tray 10. The bottom of tray 10 is preferably fluted so that there is minimum contact with the bottom edges of documents placed in the tray.

A guide rod 21 is mounted in supports 22 and 23 and extends along the right side of the tray 10. A push paddle 24, best shown in FIGURE 2, extends from a bearing housing 25 which is slide mounted on the guide rod 21. A chain 26 is driven from a suitable sprocket 27 mounted on a motor shaft 28. The chain travels over idler sprockets 29, 30, 31 and 32. A pawl 35, mounted on the housing 25, is adapted to engage the chain 26 so that the push paddle 24 will be moved toward end 10*a* of the tray 10. The housing 25, supporting the push paddle 24, may be rotated away from the tray 10 to disengage pawl 35 from chain 26. When pawl 35 is free of the chain 26, the push paddle will slide freely along the guide rod 21 so that additional documents may be added to the supply on the tray 10 for movement by the push paddle.

A lever 25*a*, with the pawl 35 at one end thereof, is pivotally mounted on pin 25*b* so that the lever may be actuated to disengage the pawl 35 from the sprocket chain 26. Thus, with the pawl disengaged, the push paddle 24 may be moved along the tray without rotation relative to rod 21. Pawl 35 is resiliently urged into engagement with the chain 26 so that the push paddle 24 may be pushed along the tray 10 toward end 10*a* without either actuating the lever 25*a* or rotating the housing 25 on the guide rod 21. Thus, the housing 25 which supports the push paddle 24 is adapted to accommodate various operations involved with the loading of documents onto the tray while assuring the positioning of the stack of documents against the end 10*a* of the tray 10.

A motor 33 drives the sprocket 27 and is de-energized in response to closure of a limit switch 34. The switch 34 will open to de-energize the motor 33 when the housing 25 engages a pushrod 34*a*.

A feeder plate 40 is located at the end 10*a* of the tray 10. As will be explained, the push paddle 24 is controlled to maintain a stack of documents against the feeder plate 40. With a constant supply of documents maintained in contact with the feeder plate 40, the top document is moved into the mouth of the transport system for travel in the direction of arrow 18.

The feeder plate 40 is operated through a drive linkage mechanism 41 in synchronism with a pair of timing wheels 42 and 42*a* by a motor 43*a*. The wheels 42 and 42*a* are mounted on shaft 43. Wheel 42*a* is shown below the broken-away portion of the wheel 42 in FIGURE 1, and is also partially shown in FIGURE 2. The timing wheels 42 and 42*a* are driven at a uniform speed. Wheels 42 and 42*a* have cam sections, such as the section 44, which are tangent with a driven roller 45 and a companion roller (not shown) mounted on the same shaft. Roller 45 is mounted at the end of bracket 13. Feeder plate 40 is mounted at end 10*a* as to be adjacent and parallel to a line which is tangent to the roller 45 at the point of contact therewith by the cam section 44. In the embodiment illustrated, the surface of the feeder plate is slightly displaced from such a tangent line toward the shaft 43 and thus may be considered to be in a plane substantially tangent to the roller 45.

Figure 3:
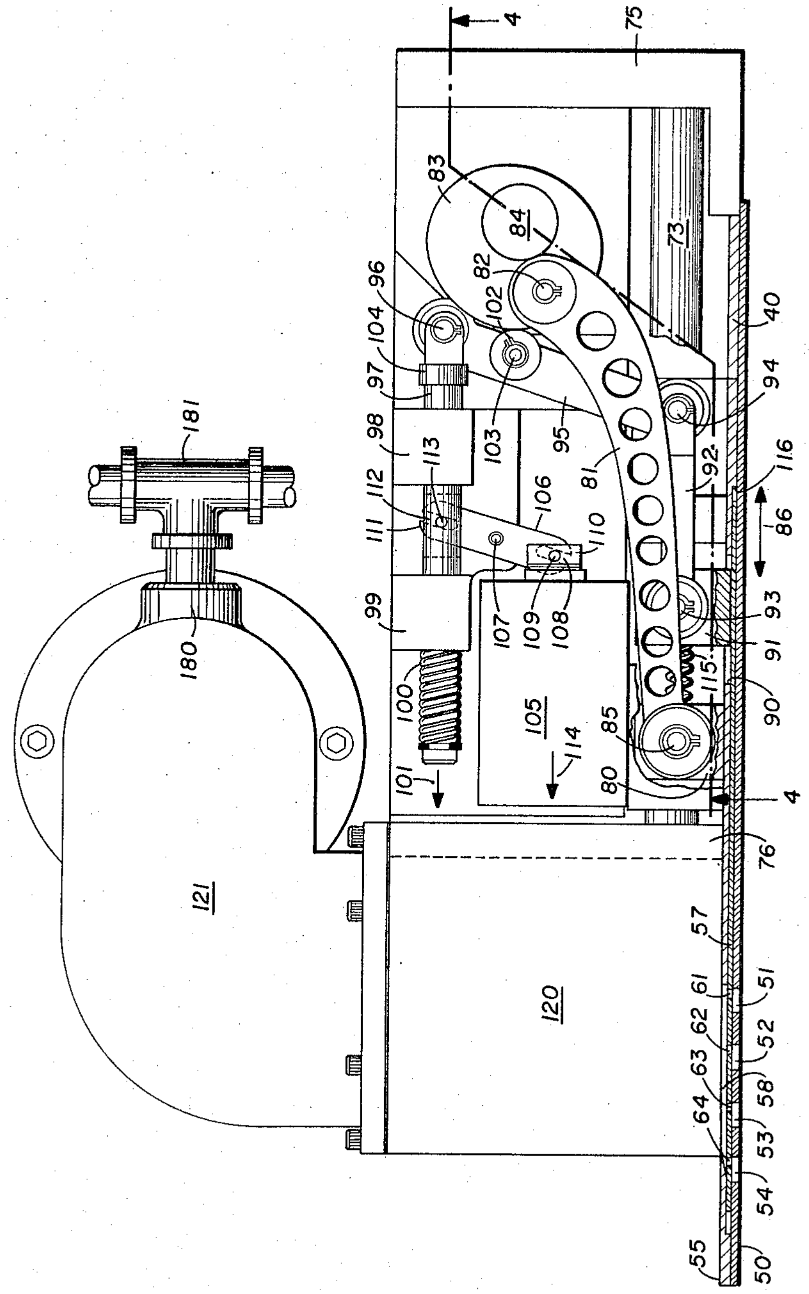
FIGURE 3 is a top view of the feeder plate mechanism.

The feeder plate, as best shown in FIGURE 3, is comprised of three elements. The first element is a face plate 50 having four vertical slots 51–54 therein. The second element is a back plate 55 secured to the face plate 50 around the periphery thereof, as by screws 56, FIGURE 4. The back plate 55 is milled centrally so that a slideway is formed between the confronting surfaces of the plates 50 and 55. The third element is a valve plate 57 positioned in the slideway between plates 50 and 55. The valve plate 57 has four relatively narrow vertical slots 61–64 therein spaced the same as slots 51–54. The back plate 55 has a large window 58 therethrough which is positioned as to register with the slots 51–54. Back plate 55 is mounted for slide movement on three bearing housings 70, 71, and 72. The upper bearing housing 70 is mounted for movement along a guide rod 73. The two lower bearing housings 71 and 72 are mounted for slide movement along a lower guide rod 74. The rods 73 and 74 are supported at the right end, as viewed in FIGURE 4, by a block 75. A plate 76, shown dotted in FIGURE 3, supports rods 73 and 74 at the left end.

Returning again to FIGURE 3, a first driving linkage is provided to reciprocate the feeder plate 40, and more specifically, to drive the back plate 55 which carries the face plate 50 with it. It will be noted that a pivot block 80 extends from the rear surface of the back plate 55. The block 80 is coupled by way of a link 81 to a crank pin 82 mounted on a cam 83. Cam 83 is mounted on a drive shaft 84. The link 81 thus couples motion of the crank pin 82 to a pivot pin 85 on the bracket 80. Thus, as drive shaft 84 rotates, the face plate 50 and the rear plate 55 of the feeder plate 40 are reciprocated as indicated by arrow 86.

A second driving linkage is provided for valve plate 57 mounted within the feeder plate 40. Valve plate 57 may be moved along its slideway relative to the face plate 50. More particularly, the rear plate 55 is provided with a window 90. A pivot block 91 extends from the rear face of the valve plate 57. A link 92 interconnects a pivot pin 93 in the block 91 and a pivot pin 94 at the end of a crank arm 95. The other end of the crank arm 95 is secured by a pivot pin 96 to the end of a solenoid-actuated bar 97. The bar 97 is slidably mounted in a pair of bearing housings 98 and 99, and supports a compression spring 100 adjacent to housing 99. The spring 100 normally forces the bar 97 in the direction of arrow 101 so that stop 104 bears against housing 98. A cam follower 102 is mounted on a pivot pin 103 at a point intermediate the length of the crank arm 95.

A solenoid 105 is mounted with its axis parallel to the axis of the rod 97. A lever 106 is pivoted at central point 107 to the frame from which the housings 98 and 99 extend. A slot 108 in one end of the crank arm 105 registers with a pin 109 in the armature 110 of the solenoid 105. The rod 97 is slotted in the zone between the bearing housings 98 and 99. The end 111 of the crank 106 has a slot 112 and extends through the rod 97. Slot 112 registers with a pin 113.

When the solenoid 105 is energized, as is the case shown in FIGURE 3, the armature 110 is retracted or moved in the direction of arrow 114. This causes the arm 97 to be moved axially so that the cam follower 102 engages the surface of the cam 83. By this means, power from the cam 83 is transmitted to the valve plate 57. A spring 115 is positioned between the pivot blocks 80 and 91, and tends to maintain the end of the valve plate 57 against the end 116 of the valve plate way in the rear plate 55.

The feeder plate 40 serves as the front closure member for a vacuum plenum chamber 120. The plenum chamber 120 is coupled by way of a manifold 121 to a vacuum blower 122, FIGURE 4. The blower 122 maintains a vacuum in the plenum chamber 120 at about six inches water column. The surface of the cam 83, the location of the pivot pin 82, and the location of the cam follower 102, are so related that the slots 61–64 in valve plate 57 register with slots 51–54 in plate 50 to open a passage during forward movement of the feeder plate 40. Thus, a document adjacent to the face of the feeder plate 40 will be grasped by reason of the vacuum in the plenum chamber applied through the slots 51–54. The movement of the valve plate 57 for opening the ports to the plenum chamber is produced by the power delivered from the cam 83 to the cam follower 102. This force overcomes the restraining force of the spring 115. However, at the end of the forward motion of the feeder plate 40, the driving force from the cam 83 is relieved so that the spring 115 moves the valve plate relative to plate 50 in the reverse direction, closing the ports leading to the plenum chamber. Grooves 117 in the face of the front plate 50 extend from the upper and lower margins of the slots 51–54 to the top of plate 50 so that the vacuum present in slots 51–54 after closure of the slots by valve plate 57 may leak off and release the document.

Figures 4, 5:
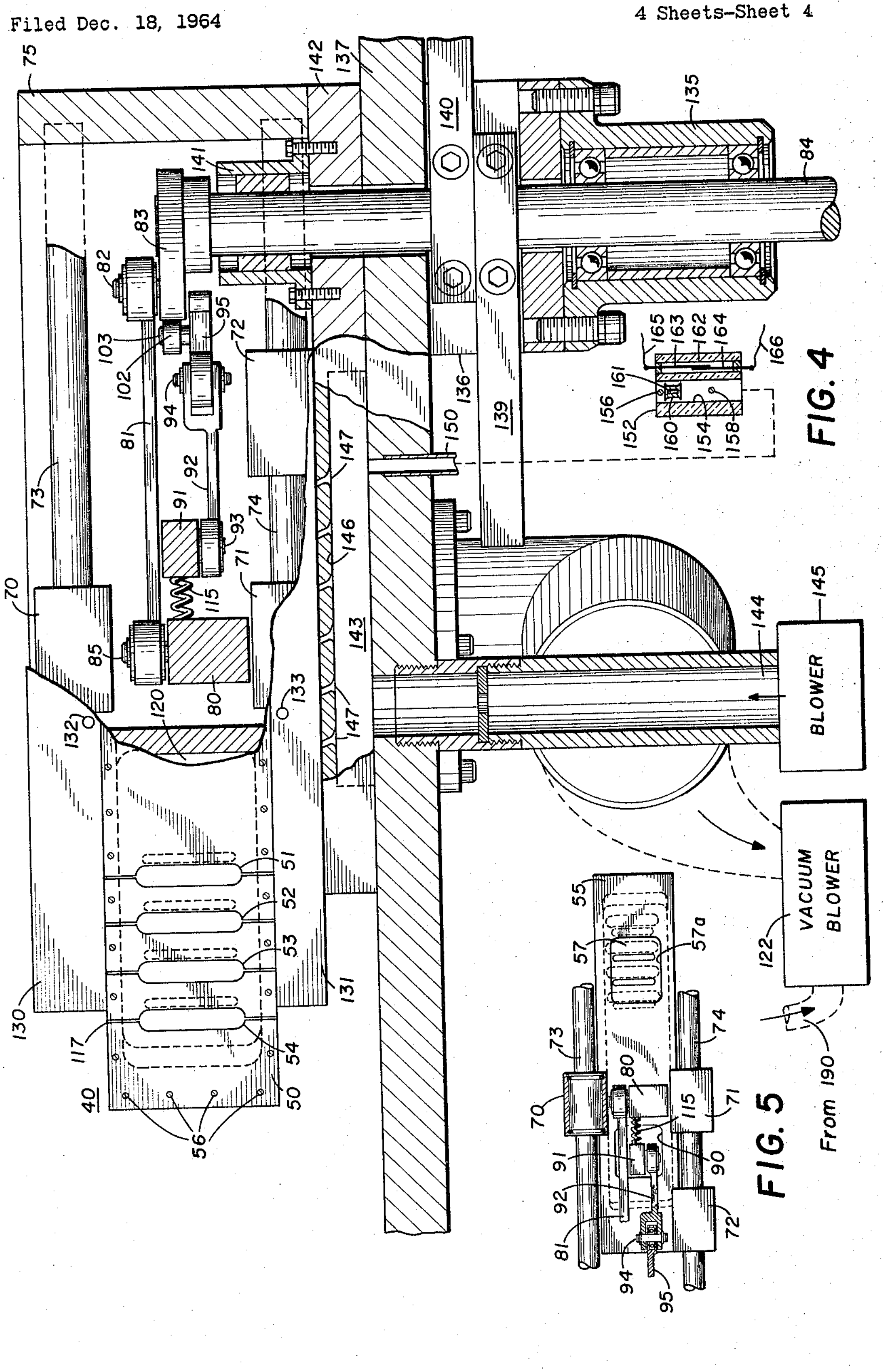
FIGURE 4 is a front view of the feeder plate mechanism.
FIGURE 5 is a rear view of a portion of the feeder plate mechanism.

The feeder plate 40 is mounted in slideways in plates 130 and 131 which have front surfaces in the same plane as the face of the plate 50. In FIGURE 5, it will be noted that the window 57*a* leading through the plate 57 into the plenum chamber 120 is not as large as the area in which the slots 51–54 are located. However, the slots passing the window 57*a* successively apply a vacuum to the document on the face of the feeder plate so that the documents are moved to the document transport system. It will be noted that two ports 132 and 133 are formed in the face plates 130 and 131, respectively. These ports are vacuum ports which are employed to sense the presence of a document adjacent to the feeder plate 40, as will hereinafter be explained.

Shaft 84 is journaled in a bearing unit 135 which is mounted by bracket 136 onto the bottom of the frame plate 137. An adjustable flywheel mechanism, including two elements 139 and 140, is mounted on the shaft 84 above the bearing unit 135. The shaft 84 is also journaled in a bearing unit 141 which is mounted on the top of the feeder tray plate 142.

As best seen in FIGURE 4, the tray plate 142 is hollow adjacent to the feeder plate 40, forming a plenum chamber 143. An air duct 144 leads from a blower 145 into the plenum chamber 143. A plate 146 serves as a top closure member for the plenum chamber 143. The plate 146 has a plurality of orifices or slots 147 extending up to the surface of the tray. The slots 147 are elongated in the direction of the length of the tray 10, as best seen in FIGURE 1. As shown in FIGURE 4, the slots 147 are slanted so that air blowing therethrough will tend to move the documents on the tray 10 in the same direction as the movement of documents by the feeder plate 40. That is, air flow through the slots 147 tends to move documents towards the mouth of the document transport system. Air flow through the slots 147 also serves to ruffle and separate the documents one from another so that the tendency to cling together is substantially decreased.

A tube 150 leads from the plenum chamber 143 to a pressure sensor 152. Sensor 152 is in the form of a plastic cylinder having cylindrical center bore 154 therein. A pair of transverse stop rods 156 and 158 extend across the bore 154. A plastic float 160 travels in bore 154 between stops 156 and 158. Float 160 includes a permanent magnet 161. When documents completely cover slots 147, the air pressure in plenum 143 is built up so that there is substantial air pressure upward through the sensor 152. Upward air flow causes the float 160 to be raised up against the stop 156. Immediately adjacent to the side of the path of the float 160 is a second bore 162 extending through the sensor 152. A pair of metallic reeds 163 and 164 extend through the bore 162. When the float 160 rests on stop 158, the reed 163 is attracted to reed 164 by the field from the magnet 161 so that the circuit leading to the reed elements 163 and 164 by way of conductors 165 and 166 is closed. However, when the pressure in plenum 143 is high, the float 160 is forced upward into contact with stop 156 and has no effect on the reed 164. Thus, the circuit 165–166 is open.

The reed switch in sensor 152 is connected in circuit with the motor 27 in the manner illustrated in FIGURE 2. The circuit illustrated in FIGURE 2 diagrammatically shows the relationship between the sensor 152 and two additional sensors 170 and 171.

Sensors 170 and 171 are similar to the sensor 152, but operate to close reed circuits therein when floats therein move upward. Sensor 170 has output lines 173 and 174, and sensor 171 has output lines 175 and 176. The switches in sensors 152, 170, and 171 are connected in parallel. Lines 173 and 175 lead to reed 163 and to one terminal of motor 33. The second terminal of the motor 33 is connected to power source 177 in circuit 178. Lines 174 and 176 are connected to reed 164 and to the source 177 by way of switch 34.

Thus, the motor 33, which drives the chain 26 to move documents toward the feeder plate, will be energized so long as switch 34 is closed and the switches in each of sensors 152, 170, and 171 are closed. The switch in sensor 152 is closed when the pressure in plenum 143 is high, meaning that all of the slots 147 are covered by the bottom edges of documents in a stack which is against the feeder plate 40.

The switches in sensors 170 and 171 are opened if the face of a document is pressed against the guide plates 130 and 131 in the region of the ports 132 and 133. More particularly, as shown in FIGURE 3, the vacuum plenum 121 has a port 180 which leads to a fitting 181. As best shown in FIGURE 2, the fitting 181 is connected by way of tubing 182 to the upper end of the sensor 170. Fitting 181 is also connected by way of tubing 183 to the upper end of sensor 171. The lower port in the sensor 170 is connected by way of tubing 184 to the port 133 in the guide plate 131, FIGURE 3. In a similar manner, the tubing 185, leading from the bottom of the sensor 171, is connected to the upper port 132 in the guide plate 130. When port 133 is uncovered, the vacuum in the plenum, as applied to the sensor 170, causes air to flow through port 133 and upwards through the sensor 170. This serves to close the switch in sensor 170, energizing motor 33 thereby to move documents into contact with the plates 130 and 131. Similarly, if documents do not close port 132, air will flow through the port 132 and upwards through the sensor 171, causing the circuit in sensor 171 to close.

If any one of the switches in sensors 152, 170, or 171 is closed, then with switch 34 closed, the motor 33 will be energized to move documents toward the guide plates 130 and 131.

It will be recognized that the current-carrying switches, in circuit with the source 177, may be solenoid-operated switches, in which case the control switches in sensors 152, 170, and 171, and the switch 34 may be in the form of sensitive control switches employed to operate such solenoids.

The motor 33 is energized when any one of the following four conditions occur: (1) Follower 25 is not in contact with the actuator **34*a*; (2) Air escapes through the slots 147 indicating that documents do not cover the same; (3) Air is drawn into port 132 indicating that the top port is not covered; (4) Air is drawn into port 133** indicating that the bottom port is not covered.

A third plenum chamber 190 is located adjacent to the mouth of the document transport system. Chamber 190 has one side 191 which lies in the plane of the side rail 20. The end 192 is spaced from the face of the feeder plate 40 and is in a confronting relation with respect thereto. Thus, the mouth of the document transport system is a narrow slot between the upstanding faces of the feeder plate 40 and face 192 of the plenum chamber 190. Chamber 190 is connected to the vacuum blower 122, FIGURE 4, and thus is subject to the same internal pressure as the plenum chamber 120. Slots are provided in the face 192 of the plenum chamber 190, so that if more than one document begins movement with the feeder plate 40 into the mouth of the document transport system, the second document will be arrested in its travel by the suction applied thereto at the face 192.

It will be noted that the cam shaft 84 and the shaft 43 on which the timing wheels 42 and **42*a* are mounted are driven in synchronism. Thus, the motor 43*a*, shown diagrammatically in FIGURES 1 and 2, is linked to both the shafts 43 and 84. In one embodiment, the timing wheels 42 and 42*a*** were rotated at a speed of 600 r.p.m, delivering documents of corresponding number each minute into the document transport system. The document transport system was of the type disclosed in U.S. Patent 3,079,147 to Childs. However, it may be of other types, all well known and, for this reason, not described in detail herein.

Thus, there is provided a system for feeding documents from the end of a stack into a conveyer. A tray unit having a bottom, an open corner formed by one side and one end, and a movable member for urging the stack toward the end is provided further with a suction plenum adjacent the end. A compound window having perforations communicates with the plenum and is slidable toward and away from the open corner. A driven wheel forms part of the conveyer and is located adjacent to the corner. A timing cam rotates periodically to engage the wheel. Drive means is provided for reciprocating elements of the compound window in synchronism with the cam to open the perforations as the window moves toward the corner and to close the perforations with impending reversal of movement. Documents are moved successively from the tray unit through the corner between the cam and driven wheel for delivery from the tray unit into the conveyer system. The elements of the compound window may selectively be deactivated to stop feeding action.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for feeding documents from the end of a stack into a conveyer which comprises:

(a) a tray unit having a bottom, an open corner formed by one side and one end, and a movable member for urging said stack toward said end,
(b) a suction plenum adjacent said end,
(c) a compound window in said end having perforations communicating with said plenum and slidable toward and away from said corner,
(d) a driven wheel forming part of said conveyer located adjacent said corner,
(e) a timing cam rotatable periodically to engage said wheel, and
(f) drive means for reciprocating elements of said compound window in synchronism with said cam to open said perforations as said window moves toward said corner and to close said perforations with impending reversal of movement to move documents successively from said tray unit through said corner between said cam and said wheel for delivery from said tray unit.

2. A system for feeding documents at the end of a stack to a conveyer which comprises:

(a) a tray unit having an open corner common to one side and one end with a movable member for urging said stack toward said end,
(b) a suction plenum,
(c) a panel positioned in said end for abutment with the document at the end of said stack with perforations for venting said plenum and slidable toward and away from said corner,
(d) a driven wheel forming part of said conveyer located adjacent said corner,
(e) a timing cam rotatable periodically to engage said wheel, and
(f) drive means for reciprocating said panel in synchronism with said cam and to open said perforations as said panel moves toward said corner and to close said perforations with impending reversal of movement to move documents successively from said tray unit through said corner between said cam and said wheel for delivery from said tray unit.

3. In a document feeder having a driven roller mounted adjacent one corner of a document tray, the combination which comprises:

(a) a timing wheel having a protruding cam section driven for periodic tangential engagement with said roller,
(b) a vacuum plenum chamber at the end of said tray adjacent to said corner,
(c) a feeder plate with slots therein forming a slidable closure for said chamber and located in a plane which is parallel and adjacent to a plane tangent to said roller at the point of contact by said section,
(d) means for reciprocating said feeder plate across the face of said chamber, and
(e) means for opening said slots during movement of said plate toward said roller to grasp and transport a document to said roller and to close said slots upon movement of said plate away from said roller.

4. A system for feeding documents from the end of a stack into a conveyer which comprises:

(a) a tray having a bottom, an open corner formed at the juncture of one side and one end of said tray, and a movable member for urging said stack toward said end,
(b) a fixed suction plenum chamber at said end adjacent to said corner,
(c) a feeder plate forming a closure for said suction plenum chamber in the plane of said end of said tray and slidable across the front of said plenum chamber, (d) transport means including a timing cam adjacent to said corner,
(e) means for driving said timing cam and for reciprocating said feeder plate in synchronism, and
(f) means for venting said plenum chamber through said feeder plate during movement of said feeder plate toward said timing cam for grasping and moving the end document from said stack into engagement with said timing cam and for closing said plenum chamber on the return stroke of said feeder plate.

5. The combination set forth in claim 4 in which a secondary suction plenum chamber is vented at a side thereof facing said feeder plate adjacent to said corner.

6. A system for feeding documents from the end of a stack into a conveyor which comprises:

(a) a tray having a bottom, an open corner formed at the juncture of one side and one end of said tray, and a movable member for urging said stack toward said end,
(b) a fixed suction plenum chamber at said end adjacent to said corner,
(c) a feeder plate forming a closure for said suction plenum chamber in the plane of said end of said tray and slidable across the front of said plenum chamber,
(d) transport means including a pair of rollers mounted on one shaft and a pair of timing cams mounted on a different shaft adjacent to said corner with said cams extending above and below said plenum chamber,
(e) a common drive means for rotating said timing cams and for reciprocating said feeder plate in timed relation for contact between said cams and said rollers at the end of each stroke of said feeder plate adjacent to said timing cams, and
(f) means for venting said plenum chamber through said feeder plate during movement of said feeder plate toward said timing cams for grasping and moving the end document from said stack into engagement with said timing cams and for closing said plenum chamber during travel of said feeder plate away from said timing cams.

7. The combination set forth in claim 1 in which a slotted pressurized plenum chamber is formed in the bottom of said tray adjacent to said end, and means responsive to low pressure in said chamber actuates said movable member for movement toward said end.

8. A system for feeding documents from the end of a stack into a conveyor which comprises:

(a) a tray having a bottom, an open corner adjacent to said conveyor formed at the juncture of one side and one end of said tray, and a movable member for urging said stack toward said end,
(b) suction feeder plate means slidable in said end of said tray toward and away from said corner,
(c) means for actuating said feeder plate means during movement of said feeder plate means toward said corner to grasp and move the end document from said stack through said corner into said conveyor and to release said end document during the return stroke of said feeder plate means, and
(d) means including sensors connected to air ports adjacent to the face of said feeder plate means and in said bottom adjacent to said end for moving said movable member toward said end in response to unimpeded air flow through any of said ports.

9. A system for feeding documents from the end of a stack into a conveyor which comprises:

(a) a tray having a bottom, an open corner formed at the juncture of one side and one end of said tray, and a movable member for urging said stack toward said end,
(b) a fixed suction plenum chamber at said end adjacent to said corner, (c) a feeder plate forming a closure for said suction plenum chamber in the plane of said end of said tray and slidable across the front of said plenum chamber, (d) transport means including a timing cam adjacent to said corner, (e) means for driving said timing cam and for reciprocating said feeder plate in synchronism, (f) means for venting said plenum chamber through said feeder plate during movement of said feeder plate toward said timing cam for grasping and moving the end document from said stack into engagement with said timing cam and for closing said plenum chamber during the return stroke of said feeder plate, and (g) means for sensing the absence of contact between a document and the face of said feeder plate for actuating and moving said movable member toward said feeder plate.

References Cited by the Examiner

UNITED STATES PATENTS

| | | | |
|---|---|---|---|
| 2,930,508 | 3/1960 | McAlpine et al. ---- | 221—211 X |
| 3,079,149 | 2/1963 | Childs -------------- | 271—27 |
| 3,123,355 | 3/1964 | Lessig ------------ | 271—30 X |

SAMUEL F. COLEMAN, *Primary Examiner.*